UNITED STATES PATENT OFFICE.

ANDREW BRUCE CRESAP, OF MANILA, PHILIPPINE ISLANDS.

MANUFACTURE OF AGGLUTINATED RICE-KERNELS.

1,221,973.  Specification of Letters Patent.  Patented Apr. 10, 1917.

No Drawing.  Application filed July 21, 1916.  Serial No. 110,490.

*To all whom it may concern:*

Be it known that I, ANDREW BRUCE CRESAP, a citizen of the United States, residing at Manila, Philippine Islands, have invented certain new and useful Improvements in the Manufacture of Agglutinated Rice-Kernels, of which the following is declared to be a full, clear, and exact description.

The invention relates to the preparation of an improved article of food or confectionery obtained from glutinous rice as a raw material.

While still in a green or unripe state just prior to maturity, the rice is cut and after garnering, is roasted over a suitable fire until the outside or hull becomes crisp while the inside or kernel remains soft. Yet in this fresh condition, the charge is subjected to the action of rollers or pounders to separate the hulls from the kernels after which the rolled and hulled rice is heated anew by toasting over an open fire. The heat not only quickens the separation of the kernels from the stalks and of the hulls from the grain but in the several kernels induces a copious sap-like flow which measurably envelops the granules with a gluten coat later rendered sticky by watery evaporation. At the finish, the toasted particles are emptied into a suitable receptacle to compact together and become coherent as the gluten cools and sets.

The finished product thus prepared may be put upon the market either alone or else with addition of a pure vegetable oil admixed in the final toasting to impart a distinctive flavor.

On mixing with a proper syrup the compound can be formed into confectionery cakes. Other modifications within the skill of the artisan to effect render the material acceptable in various rôles.

Having thus described my invention, what I claim as new and desire to secure by Letters Patent, is:—

1. As a new article of manufacture, hulled, unripe rice kernels, toasted and left coherent in their own gluten, substantially as described.

2. As a new article of manufacture, hulled, unripe rice kernels, toasted and left coherent in their own gluten with vegetable oil addition, substantially as described.

3. The process of preparing unripe rice kernels which consists in roasting the garnered grains until the hulls become crisp, pounding or rolling to remove the hulls and finally toasting the exposed kernels to afford gluten excess that is coherent between cold granules.

4. The process of preparing unripe rice kernels which consists in roasting the garnered grains until the hulls become crisp, pounding or rolling to remove the hulls and with vegetable oil addition finally toasting the exposed kernels to afford gluten excess that is coherent between cold granules.

ANDREW BRUCE CRESAP.

Witnesses:
R. T. MORLEWS,
H. PASCUAL.

Copies of this patent may be obtained for five cents each, by addressing the "Commissioner of Patents, Washington, D. C."